United States Patent [19]

Fero et al.

[11] Patent Number: 4,842,807

[45] Date of Patent: * Jun. 27, 1989

[54] SUPPORT STAND FOR TOP ACCESS REACTOR CAVITY DOSIMETRY

[75] Inventors: Arnold H. Fero, New Kensington; Stanwood L. Anderson, Jr., Plum Borough, both of Pa.

[73] Assignee: Westinghouse Electric Corp., Pittsburgh, Pa.

[*] Notice: The portion of the term of this patent subsequent to Jul. 4, 2006 has been disclaimed.

[21] Appl. No.: 171,369

[22] Filed: Mar. 21, 1988

Related U.S. Application Data

[63] Continuation-in-part of Ser. No. 32,894, Mar. 31, 1987.

[51] Int. Cl.$^4$ ............................................. G21C 17/00
[52] U.S. Cl. ...................................................... 376/254
[58] Field of Search ................ 376/254, 255, 249, 154, 376/155

[56] References Cited

U.S. PATENT DOCUMENTS

| | | | |
|---|---|---|---|
| 3,089,958 | 5/1963 | Janner | 250/83.1 |
| 3,809,940 | 5/1974 | Sekella | 313/61 R |
| 3,971,944 | 7/1976 | Quinby | 250/391 |
| 4,044,301 | 8/1977 | Allain et al. | 376/255 |
| 4,069,097 | 1/1978 | Frank . | |
| 4,079,236 | 3/1978 | Graham et al. | 364/504 |
| 4,097,330 | 6/1978 | Neissel . | |
| 4,157,277 | 6/1979 | Marmonier . | |
| 4,186,048 | 1/1980 | Thomas . | |
| 4,200,491 | 4/1980 | Ball . | |
| 4,288,291 | 9/1981 | Cisco et al. . | |
| 4,318,776 | 3/1982 | Proll et al. | 376/254 |
| 4,404,164 | 9/1983 | Kopp et al. | 376/154 |
| 4,504,437 | 3/1985 | Underwood et al. | 376/153 |
| 4,639,349 | 1/1987 | Baratta et al. | 376/254 |
| 4,729,866 | 3/1988 | Ruddy et al. | 376/153 |

FOREIGN PATENT DOCUMENTS

| | | |
|---|---|---|
| 612001 | 1/1961 | Canada . |
| 54-103990 | 8/1979 | Japan . |
| 59-102193 | 6/1982 | Japan . |
| 59-203997 | 6/1983 | Japan . |
| 51-15798 | 7/1984 | Japan . |

*Primary Examiner*—Deborah L. Kyle
*Assistant Examiner*—Daniel Wasil

[57] ABSTRACT

A reactor cavity dosimetry system and method for deploying the system which includes a top access support stand. Having a generally rectangular frame assembly formed by a pair of cross members and a pair of frame tubes, the support stand holds the dosimetry in place as part of a continuous loop. The continuous loop is first fed through a U-shaped tube situated beneath the support stand, and coupled together by a chain support plug which is adapted for insertion within a hole formed in an upper one of the cross members to fix the position of the dosimetry axially with respect to the core of a nuclear power plant within which the system is deployed. Each of the frame tubes has mounted thereon a pivotable arm assembly with a spring-loaded slide. After insertion within the cavity, the arm assemblies are pivoted out from the plane of the frame assembly, and disposed locked in place perpendicularly across the cavity. The spring-loading of the arm assemblies thus maintains the support stand in a substantially upright position.

28 Claims, 5 Drawing Sheets

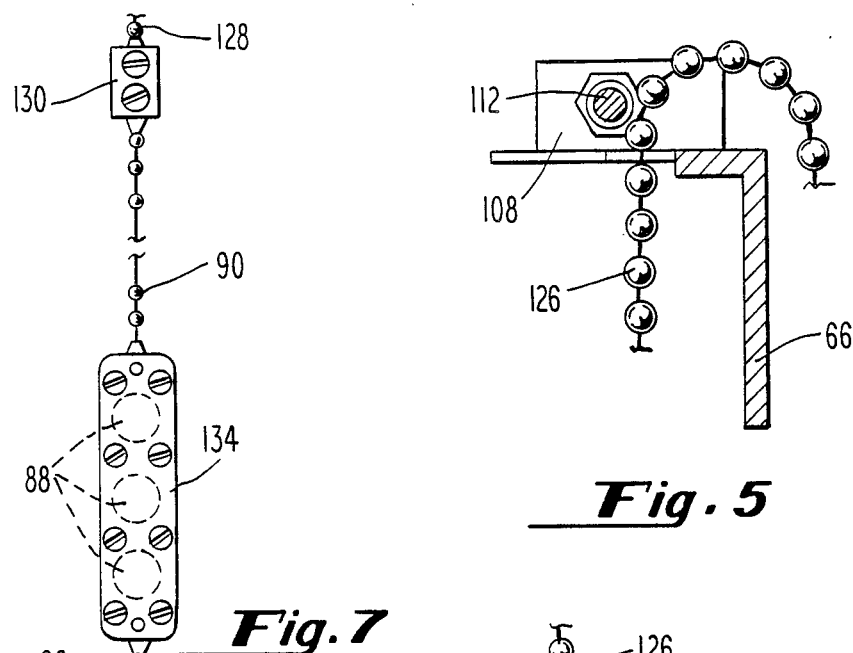
Fig. 5
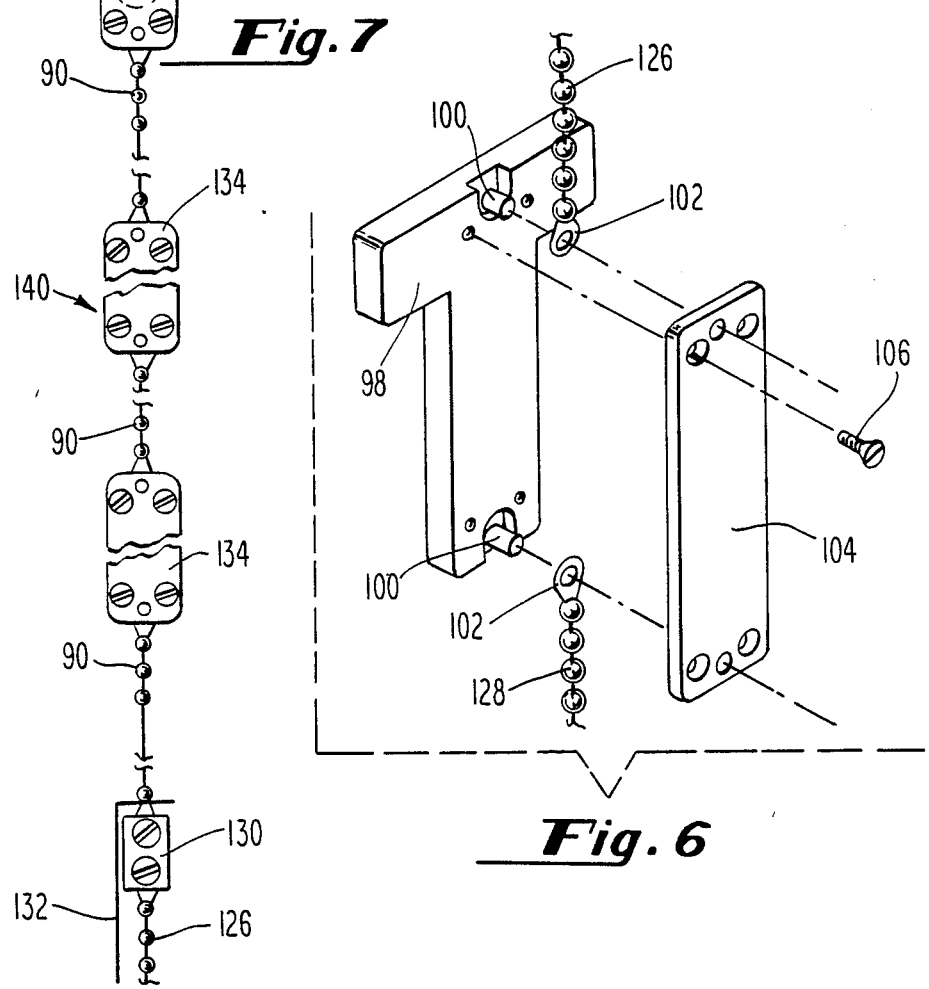
Fig. 7
Fig. 6

SUPPORT STAND FOR TOP ACCESS REACTOR CAVITY DOSIMETRY

CROSS-REFERENCE TO RELATED APPLICATIONS

This is a continuation-in-part of Ser. No. 032,894, filed Mar. 31 1987 in the name of Arnold Fero, Stanwood Anderson, and James Sejvar, and entitled "Reactor Cavity Dosimetry System and Method".

BACKGROUND OF THE INVENTION

The present invention relates generally to methods and apparatus which monitor nuclear reactors, and more particularly to such methods and apparatus employing parameters which are monitored exterior of the reactor core.

As is well known, conventional pressurized water reactors typically contain a reactive region, commonly referred to as the "core", in which sustained fission reactions occur to generate heat. The core includes a plurality of elongated fuel rods comprising fissile material, positioned in assemblies and arranged in a prescribed geometry governed by the physics of a nuclear reaction. Neutrons bombarding the fissile material promote the fissionable reaction which, in turn, releases additional neutrons to maintain a sustained process. The heat generated in the core is carried away by a cooling medium which circulates among the fuel assemblies, and is conveyed to heat exchangers which, in turn, produce steam for the generation of electricity.

A neutron absorbing element is also included within the cooling medium in controlled variable concentrations to modify the reactivity, and thus the heat generated within the core as required. In addition, control rods are interspersed among the fuel assemblies, longitudinally movable axially within the core, to control the reactivity of the core and thus its power output.

The power output, or distribution within the core is determined by, among other things, neutron flux distribution. While the radial power distribution of the core is fairly predictable, due to the prescribed arrangement of fuel assemblies and the positioning of control rods which are symmetrically situated radially throughout the core, the axial power distribution can vary greatly during reactor operation. Furthermore, over the lifetime of a nuclear power plant, changing fuel management schemes can result in significant changes in both the magnitude and distribution of neutron flux and, hence, neutron fluence throughout the reactor vessel beltline region. It is, therefore, desirable to monitor the axial power distribution within the core of a nuclear power plant.

Axial power distribution monitoring is typically conducted within conventional nuclear power plants through in-core instrumentation as well as ex-core instrumentation. In-core instrumentation systems are generally comprised of movable miniature fission chambers which are designed to yield information pertaining to neutron flux distribution at selected locations in the reactor core, fuel assembly outlet thermocouples, and in some cases, fixed miniature fission chambers. Such systems provide an accurate measure of the core relative power distribution, but provide no automatic protective function for the reactor.

On the other hand, ex-core instrumentation systems are typically comprised of uncompensated, long ion chambers or power range detectors which are located in four vertical instrument wells outside of the reactor vessel and symmetrically placed with respect to the core. Such power range detectors are calibrated to their respective in-core system and are used to provide automatic reactor protection against adverse power peaking. Additional information is also obtained by the use of supplementary passive neutron dosimeters installed within the annular-shaped reactor cavity between the walls of the reactor vessel and the primary biological shield.

Prior art approaches which have utilized such supplementary passive neutron dosimeters have typically hung the dosimeters by stainless steel, nickel or iron wires at various locations within the reactor cavity. Accurate placement of the dosimeters, however, was difficult at best since the reactor cavity in most nuclear power plants is narrow and often largely inaccessible. Movement of the dosimeters, due to various causes such as mechanical vibrations, heavy ventilating air currents passing over the dosimeters, and expansion or contraction of the reactor vessel during heat-up and cool-down, further complicate the accuracy and repeatability of dosimeter placement over the life of the nuclear power plant. It is, therefore, readily apparent that a method and apparatus for accurately and repetitively placing supplementary passive neutron dosimeters within the reactor cavity would be desirable.

Another problem with such prior art approaches to the placement of supplementary passive neutron dosimeters is the interference they often create with refueling operations. During a typical refueling operation (i.e., during the replacement of the fuel assemblies of a nuclear reactor after exhaustion of their fuel), the head assembly of the reactor vessel must be removed in order to withdraw the spent fuel assemblies. Additional shielding must be provided, however, due to the potentially dangerous radiation levels which are experienced during refueling. Accordingly, the reactor cavity is sealed off in order that the space above the reactor vessel may be flooded with water.

Such sealing of the reactor vessel is accomplished most often in one of two ways. A first approach merely clamps a heavy steel plate over the reactor cavity, with the steel plate including gaskets on either side of the cavity. The second approach utilizes the steel plate of the first approach, but additionally employs an inflatable bladder which serves to further seal the reactor cavity at a top portion thereof. As can be readily appreciated, therefore, any reactor cavity dosimetry system which is to be used in such nuclear power plants must avoid the possibility of puncturing the inflated bladder.

In addition to the access problems presented by the varying configurations of reactor cavities, problematic placement of a reactor cavity dosimetry system is further aggravated by the need for personnel changing the dosimeters to wear protective clothing. As is conventional, in order to work about a deactivated reactor, personnel must wear many layers of protective clothing and a full-face respirator. Not only does such protective clothing severely impair the dexterity of the wearer, but it can also lead to the wearer's suffering heat prostration under long periods of use. It would, therefore, be desirable in the design of a reactor cavity dosimetry system to provide one which is capable of rapid and remote deployment.

A recent method of deploying a reactor cavity dosimetry system is disclosed in Ser. No. 032,894, to which the present application is a continuation-in-part. The system and method disclosed therein, however, is dependent upon the remote positioning and retrieval of the supplementary passive neutron dosimeters from the reactor sump which is located beneath the reactor vessel. High radiation levels or deep water within the sump, as well as the lack of permanently installed scaffolding therein, all lead one to the conclusion that, when such conditions are present, a reactor cavity dosimetry system would be more desirably positioned and retrieved from atop the reactor vessel.

SUMMARY OF THE INVENTION

Accordingly, it is a general object of the present invention to provide a method and apparatus for monitoring neutron exposure to a reactor vessel. More specifically, it is an object of the present invention to provide a reactor cavity dosimetry system which is capable of accurate and repetitive placement of the dosimeters at a plurality of preselected locations within the reactor cavity.

Another object of the present invention is to provide a reactor cavity dosimetry system and method of utilizing same which does not interfere with refueling operations of the reactor.

Still another object of the present invention is to provide a reactor cavity dosimetry system and method of utilizing same which is capable of rapid placement of the dosimeters from a remote location in order to minimize exposure of the personnel operating such systems to high radiation levels.

Yet another object of the present invention is to provide a reactor cavity dosimetry system and method of utilizing same that is deployed from atop the reactor cavity.

Briefly, these and other objects of the present invention are accomplished by a reactor cavity dosimetry system and method for deploying the system which includes a top access support stand. Having a generally rectangular frame assembly formed by a pair of cross members and a pair of frame tubes, the support stand holds the dosimetry in place as part of a continuous loop. The continuous loop is first fed through a U-shaped tube situated beneath the support stand, and coupled together by a chain support plug which is adapted for insertion within a hole formed in an upper one of the cross members to fix the position of the dosimetry axially with respect to the core of a nuclear power plant within which the system is deployed. Each of the frame tubes has mounted thereon a pivotable arm assembly with a spring-loaded slide. After insertion within the cavity, the arm assemblies are pivoted out from the plane of the frame assembly, and disposed locked in place perpendicularly across the cavity. The spring-loading of the arm assemblies thus maintains the support stand in a substantially upright position.

The above and other objects, advantages and novel features according to the present invention will become more apparent from the following detailed description thereof, when considered in conjunction with the accompanying drawings wherein:

BRIEF DESCRIPTION OF THE DRAWINGS

FIG. 5 is an enlarged view of the slot shown in FIG. 3;

FIG. 6 is an exploded perspective view of the chain support plug shown in FIG. 3; and FIG. 7 is a diagrammatic view of the sensor set used with the reactor cavity dosimetry system according to the present invention.

DETAILED DESCRIPTION OF THE INVENTION

Figure 1:
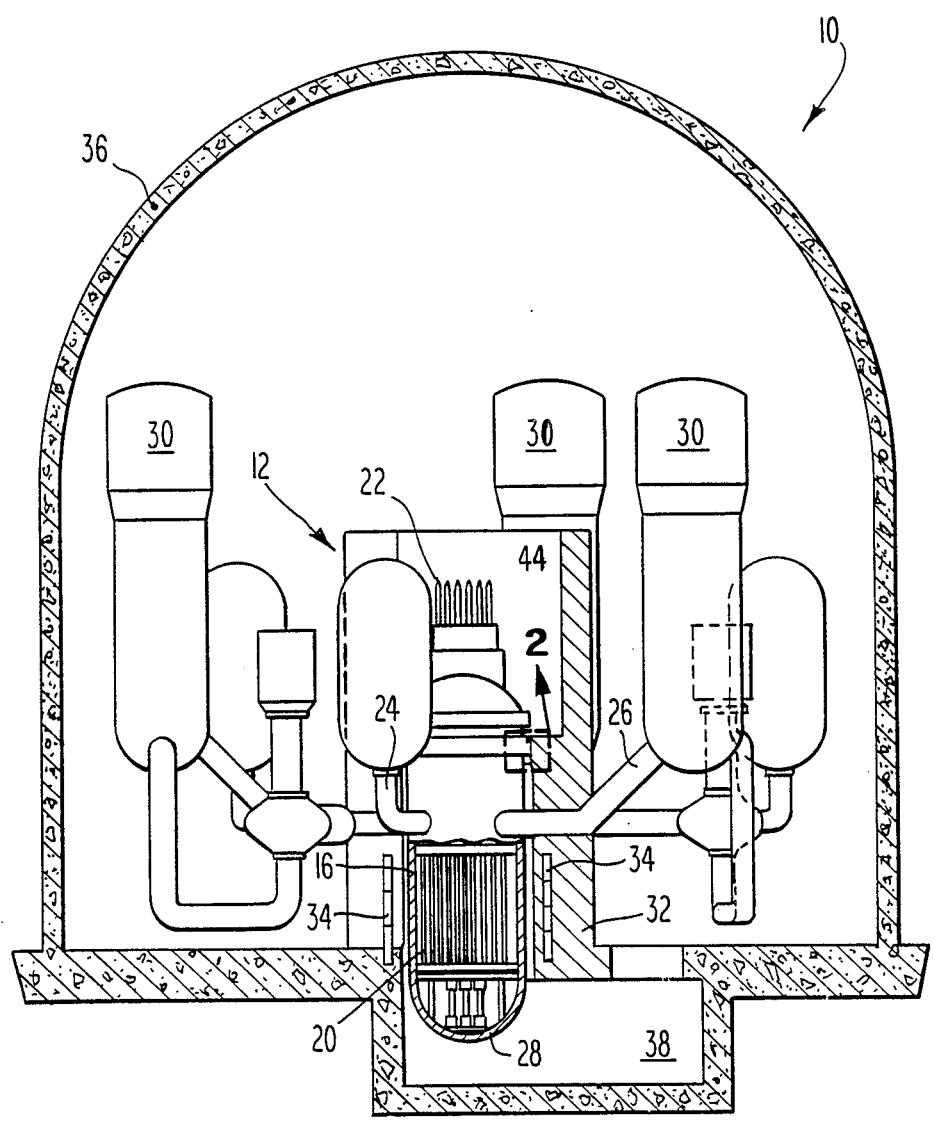
FIG. 1 is a diagrammatic view of a typical nuclear power plant.

Referring now to the drawings, wherein like characters designate like or corresponding parts throughout the several views, there is shown in FIG. 1 a diagrammatic representation of a typical nuclear power plant 10, having a pressurized water reactor (PWR) 12 contained within a reactor vessel 14. As is well known, the reactor vessel 14 forms a pressurized container for a nuclear core 16 when sealed by a head assembly 18.

Consisting mainly of a plurality of clad nuclear fuel elements 20 arranged in assemblies for generation of substantial amounts of heat through a conventional fission process, the core 16 is controlled by part-length and full-length control rods 22. The specific amount of heat which is generated by the core 16 is dependent primarily upon the position of such control rods 22 with respect to the fuel elements 20.

Heat generated by the core 16 is conveyed therefrom by a coolant flow entering through an inlet means 24 and exiting through an outlet means 26, each of which is formed integral with and through a cylindrical wall 28 of the reactor vessel 14 and is otherwise known as a "nozzle". Generally, the coolant flow exiting through the outlet means 26 is conveyed to one or more steam generator systems 30, wherein a heat exchange relationship is established between the coolant flow and water (otherwise known as "secondary coolant") which is utilized to produce steam. The steam thus produced is conventionally used to drive a turbine-generator (not shown) for the ultimate production of electricity.

A closed recycling "primary", or steam generating loop, is thus provided with coolant piping coupling the reactor vessel 14 and the steam generator systems 30. As is apparent, the reactor vessel 14 illustrated in FIG. 1 is adaptable for three such loops, although it should be understood that the number of such loops varies from plant to plant with two, three, or four such loops being commonly employed.

As is also shown in FIG. 1, the PWR 12 is surrounded by a primary biological shield 32, typically made of concrete, for minimizing the escape therefrom of the biologically-hazardous radiation which is emitted by the PWR 12. In order to monitor the core 16, ex-core neutron detectors 34 (in addition to various forms of in-core instrumentation, not shown) are disposed symmetrically about the core 16 within the biological shield 32. The entire plant 10 is typically enclosed by a containment 16, which includes a reactor sump 38 formed beneath the core 16. Other details relating to purposes of the in-core an ex-core instrumentation, as well as details relating to be operation of a conventional PWR 12 may be found in the above mentioned Ser. No.

032,894, which is assigned to the assignee of the present invention and is incorporated herein by reference.

Figure 2:
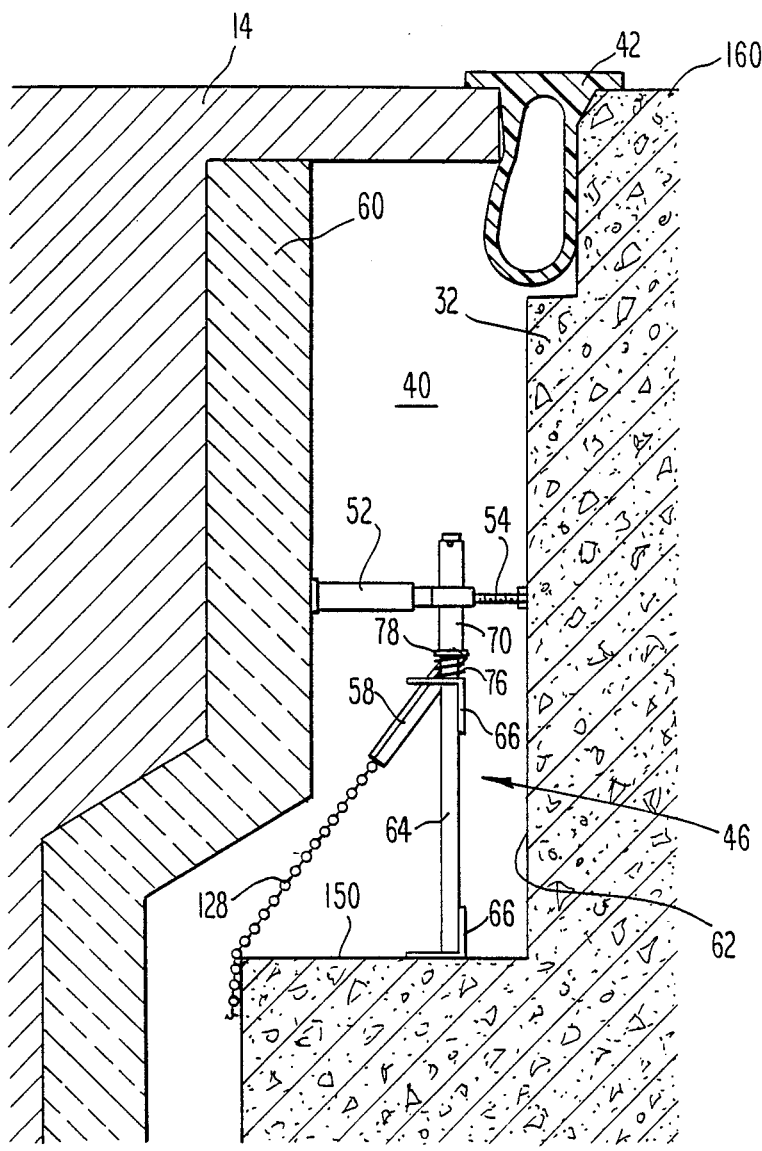
FIG. 2 is an enlarged view of the circled portion shown in FIG. 1, illustrating a side view of a top access support stand used with the reactor cavity dosimetry system according to the present invention.

While much information can be obtained through such in-core and ex-core instrumentation, additional information can be obtained by installing supplementary passive neutron dosimeters within an annulus formed between the reactor vessel 14 and the biological shield 32. That annulus, referred to as the reactor cavity 40, is shown in FIG. 2.

Prior art approaches to the installation of supplementary neutron dosimeters within the reactor cavity 40 typically hung such dosimeters from accessible portions of the reactor vessel 14 on lengths of stainless steel, nickel or iron wires. Not only were such approaches subject to inaccurate placement of the dosimeters axially with respect to the "beltline" region of the reactor vessel 14, but they also presented problems during change out of the fuel elements 20 (i.e., "refueling operations"). As is well known, an inflatable bladder 42 is often used to seal the uppermost space between the reactor vessel 14 and the biological shield 32. Such a bladder 42 allows the space 44 (FIG. 1) within the biological shield 32 and above the reactor vessel 14 (sometimes referred to as the "refueling cavity") to be flooded with water in order that the radiation associated with the removal of fuel elements 20 from the reactor vessel 14 can be minimized.

As is readily apparent, therefore, prior art approaches which hung the dosimeters from wires could easily present puncture hazards to the bladder 42, or they could prevent the bladder 42 from properly sealing the uppermost space between the reactor vessel 14 and the biological shield 32. Further problems related to the inaccuracy of placement of the dosimeters resulted from movement of such dosimeters due to the heavy ventilating air currents within the reactor cavity 40, mechanical vibrations during operation of the PWR 12, and expansion or contraction of the reactor vessel 14 during heat-up and cool-down of the plant 10.

Figure 3:
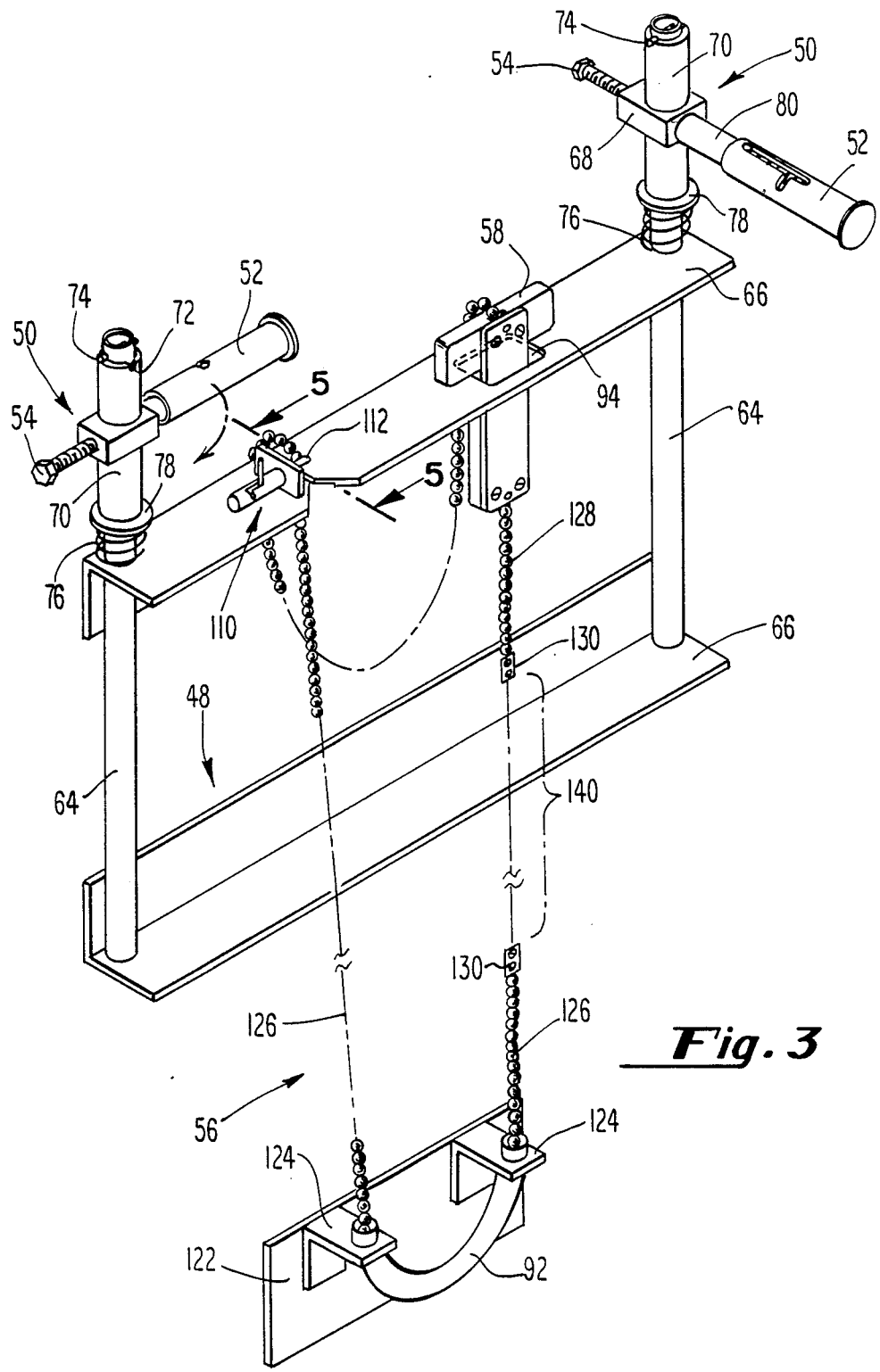
FIG. 3 is a perspective view of the support stand shown in FIG. 2.

In an effort to overcome such problems, the inventors of the present application disclosed in Ser. No. 032,894 a system and method for accurately and repetitively positioning supplementary neutron dosimeters within the reactor cavity 40 of a PWR 12. The system was comprised generally of a means for indicating a neutron dosage accumulated over the fuel cycle of a nuclear reactor, and a means for remotely positioning the indicating means at a plurality of preselected locations within the reactor cavity. The indicating means comprises a plurality of dosimeters arranged along a length of bead chain adapted to be formed in a continuous loop 56 (FIG. 3). In accordance with a first embodiment of that invention, the positioning means comprises U-shaped tubes which are affixed to the walls of the reactor vessel. The continuous loop is led through such tubes, with the dosimeters being remotely positioned from the reactor sump. According to another embodiment of that invention, the positioning means comprises a collapsible support stand, installed within the reactor cavity, from which is suspended a bar having at least one of the U-shaped tubes which is also used to guide the continuous loop as remotely positioned from the reactor sump.

A major problem which is presented by the reactor cavity dosimetry system and method according to Ser. No. 032,894, however, is that its implementation is difficult in nuclear power plants having access restrictions to their reactor sumps. Such restrictions may be due to any one or more of the three following factors: (1) the presence of high radiation levels within the reactor sump; (2) the presence of deep water within the reactor sump; or (3) the absence of permanent scaffolding within the reactor sump. Accordingly, it is readily apparent that a more accessible reactor cavity dosimetry system and method than that which is disclosed in Ser. No. 032,894 would be desirable in nuclear power plants having the above-noted restrictions, since each of the embodiments described therein require access to the reactor sump for positioning and retrieval of the dosimeters.

In accordance with one important aspect of the present invention, therefore, access for positioning and retrieving the dosimeters is provided for from the top of the reactor vessel 14. Referring again to FIG. 2, there is shown a top access support stand 46 installed within the reactor cavity 40 in order to accurately and repetitively position dosimetry means (not shown in FIG. 2) relative to preselected positions axially with respect to the core 16.

As is shown in greater detail in FIGS. 3-7, the top access support stand 46 is comprised generally of a frame assembly 48, a pair of pivot arm assemblies 50 which include a spring-loaded slide 52 and a radial take-up bolt 54, and a continuous chain loop 56 including a chain support plug 58. Referring for the moment to FIG. 3, it can be seen that the continuous chain loop 56 is further comprised of a transport chain 126, a locating chain 128, and a dosimetry chain 140.

The pivot arm assemblies 50 are each adapted to be rotated from a stowed position within the same plane as the frame assembly 48 to a locked position perpendicularly deployed across the reactor cavity 40. In such a deployed position, as shown in FIG. 2, the slides 52 of both pivot arm assemblies 50 are spring-loaded against an insulation layer 60 attached to the reactor vessel 14 in order to maintain the top access support stand 46 in a suitable orientation. Where necessary, the radial take-up bolts 54 are installed and adjusted to account for variations in the distance between the insulation layer 60 and an outer wall 62 of the reactor cavity 40 as determined by field measurements.

The frame assembly 48, as can be seen from FIG. 3, is comprised generally of a pair of frame tubes 64 which are attached, such as by welding, to a pair of cross members 66. For reactor cavities 40 of a typical size, the frame tubes may be comprised of Type 304 stainless steel tubing having a ½-inch outer diameter and a 0.065" thick wall, while the cross members 66 may be likewise comprised of Type 304 stainless steel 1½" by 1½" angles having a ⅛" thick wall. The overall dimensions of the fully-assembled top access support stand 46 is, therefore, approximately 12 inches by 12 inches.

Figure 4:
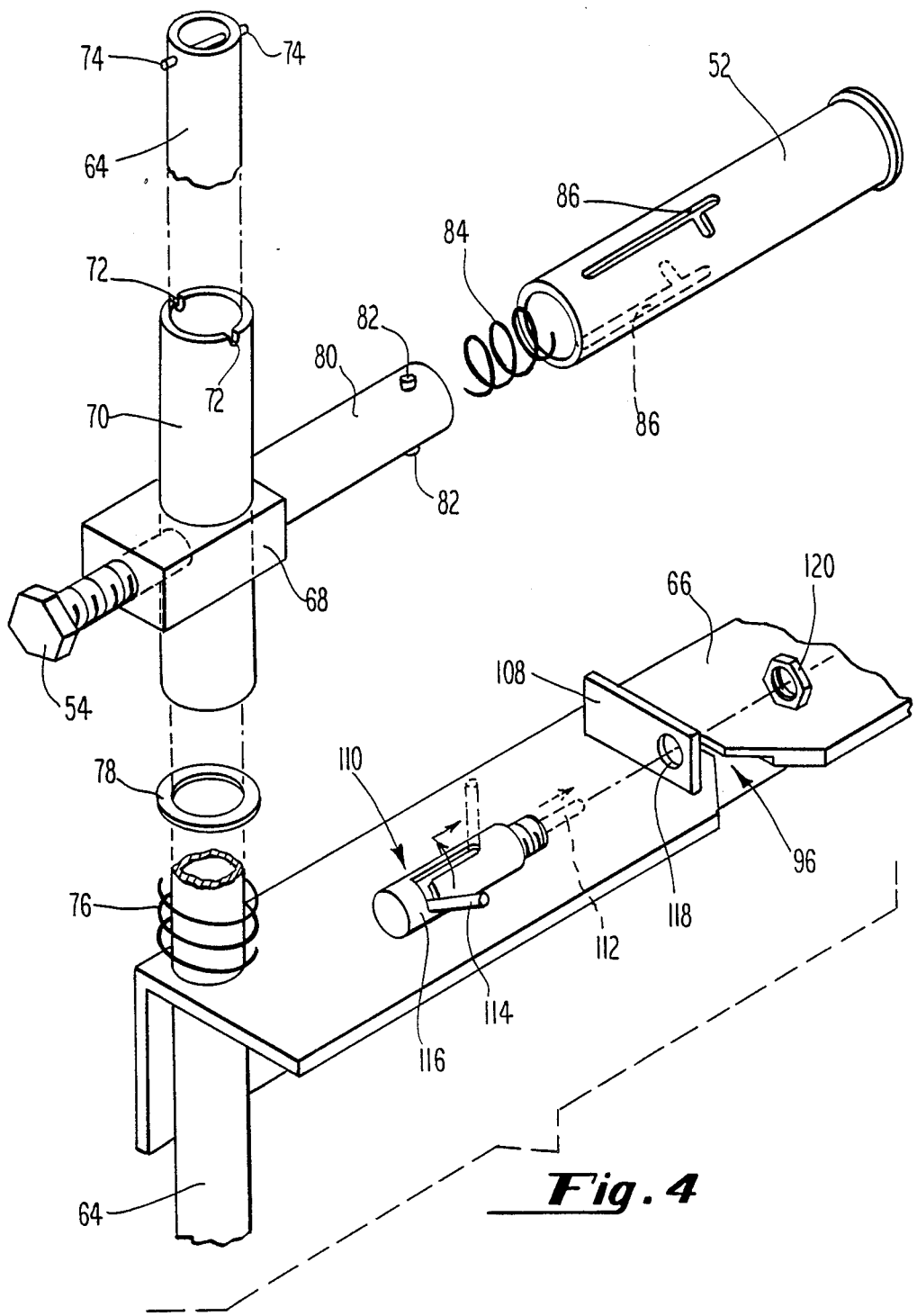
FIG. 4 is an exploded perspective view of an upper portion of the support stand shown in FIG. 3.

Referring for the moment to FIG. 4, details of the pivot arm assemblies 50 will now be explained. While only one such pivot arm assembly 50 is shown in FIG. 4, it should be understood that each pivot arm assembly 50 includes a joint block 68 mounted to a frame sleeve 70 which is slidably coupled to its respective frame tube 64. A pair of diametrically opposed grooves 72 are formed in the top of the frame sleeve 70 for engagement with a spring pin 74 which is fitted at the top of each frame tube 64. As thus configured, the pivot arm assemblies 50 are adapted to be locked into position disposed perpendicularly across the reactor cavity 40 when the frame sleeves 70 are pushed upward by respective coil springs 76 and washers 78, thereby engaging the spring pin 74 with the grooves 72.

Also attached to each joint block 68 is a pivot arm tube 80 having a spring pin 82 fitted through parallel to the frame sleeve 70. Slidably coupled to the pivot arm tubes 80 are the slides 52. Each such slide 52 is spring-loaded to be biased outward from its respective pivot arm tube 80 by a coil spring 84 mounted within the slide 52. A pair of T-shaped slots 86 are also formed in each slide 52 in order to provide a bayonet joint between the slide 52 and its respective pivot arm tube 80, the slots 86 slidingly engaging the spring pin 82. As thus configured, the slides 52 may be locked in a compressed fashion against the force of their springs 84 by sliding the slides 52 inwardly towards their respective joint block 68, guided by a major portion of the slots 86. Upon reaching the junction of the major portion of the slots 86 with a minor, perpendicularly disposed portion of the slots 86, the slides 52 are rotated about their respective pivot arm tube 80, forcing the spring pin 82 within the minor portions of the slots 86, thereby locking the slides 52 in place.

Referring again to FIG. 3, in conjunction with FIGS. 4–6, a means for accurately and repetitively positioning reactor cavity dosimetry (such as that shown in FIG. 7) at a plurality of preselected locations within the reactor cavity 40 remotely from a plane where the head assembly 18 joins the walls 28 of the reactor vessel 14, will now be explained.

The reactor cavity dosimetry shown in FIG. 7, constituting a means for indicating the neutron dosage accumulated by the reactor vessel 14 over a fuel cycle, is similar in all respects to that which is described and claimed in copending application Ser. No. 032,894. It is, therefore, comprised generally of a plurality of sensor sets 88, contained within holders 134 (FIG. 7), which are coupled together by lengths of beaded chain 90 and are guided from the remote location to preselected locations within the reactor cavity 40 by a U-shaped tube 92. A detailed discussion of the requirements for such dosimetry, however, is not deemed to be necessary for a complete understanding of the present invention. The description of such dosimetry contained within Ser. No. 032,894 is, therefore, incorporated herein by reference.

In order to repeatedly position the indicating means at a plurality of preselected locations within the reactor cavity 40 remotely from a plane where the head assembly 18 joins the walls 28 of the reactor vessel 14, the upper cross member 66 of the top access support stand 46 includes a hole 94 adapted to hold the chain support plug 58 and a slit 96. The chain support plug 58 supports one end of a continuous loop comprising the sensor sets 88 and the beaded chain 90, while the slit 96 entraps the other end.

As shown in greater detail in FIG. 6, the chain support plug 58 is comprised generally of a T-shaped back member 98 having a pair of pins 100 formed therein. An end connector 102 attached to the beaded chain 128 is adapted to be mounted over the pin 100 in such a manner as to hang straight from the chain support plug 58. Each end of the chain 56 comprising the continuous loop is, thus, coupled to the chain support plug 58 by the end connectors 102 which are held in place by a cover member 104, mounted upon the back member 98 by any conventional means such as screws 106. The sensor sets 88 shown in FIG. 7 are hung by the locating chain 128 depending from the bottom (as shown in FIG. 6) of the chain support plug 58, while the other end of the continuous loop, starting from the transport chain 126 depending from the top (as shown in FIG. 6) of the chain support plug 58, is routed over to and held in place by the slit 96. The length of the locating chain 128 is based upon a field measurement relative to the top surface of the upper cross member 66.

Referring again to FIGS. 3–5, it can be seen that the slit 96 is formed in the top portion of the upper cross member 66, and includes an outer, triangular-shaped portion which narrows down in the vicinity of a plate 108 having mounted thereto a spring plunger 110. In accordance with a presently preferred embodiment of this invention, the spring plunger 110 is comprised of a full-travel, hand-retractable spring plunger which allows its plunger portion 112 to be withdrawn completely into its body portion 114 and then locked into the fully retracted position. Unlocking and extending the plunger portion 112 from the body portion 116 is, thereby easily accomplished by simply turning a handle portion 114 as shown in FIG. 4. One suitable such spring plunger 110 is manufactured by Reid Tool Supply Company.

The spring plunger 110 is mounted to the plate 108, through a hole 118 formed therein, by any conventional means such as a nut 120. As thus configured, and referring especially to FIGS. 3 and 5, the plunger portion 112 of the spring plunger 110 is adapted when extended to trap the transport chain 126 locked within the slit 96 to accurately and repetitively position the other end of the continuous loop. It should be noted at this juncture, referring again to FIG. 4, that the width of the slit 96 as well as the thickness of the upper cross member in close proximity to the slit 96 are both formed to be substantially equal to the dimensions of the wire between a pair of individual beads in the transport chain 126. Such a configuration, it has been found, enables the transport chain 126 to be easily but adequately captured within the slit 96 during the remote positioning of the reactor cavity dosimetry.

The U-shaped tube 92 shown in FIG. 3 is conveniently mounted to a support plate 122 by a pair of brackets 124, the support plate 122, in turn, being attached to the insulation layer 60 surrounding the reactor vessel 14 by any suitable means such as #14×⅞" long self-tapping stainless steel screws (not shown). One such combination of U-shaped tube 92, support plate 122 and brackets 124 is mounted at each of a plurality of preselected locations azimuthally about and beneath the reactor vessel 14. The "legs" of the U-shaped tubes 92 are disposed upwardly towards the top access support stand 46 as shown in FIG. 3.

Once the guide means comprising the U-shaped tubes 92, support plates 122, and brackets 124 are, thus, disposed, the reactor cavity dosimetry may be accurately and repetitively positioned axially with respect to the core 16. A suitable length of the beaded chain (referred to hereinbefore as the "transport chain" 126) is routed through each of the U-shaped tubes 92, with the free ends thereof being brought up to the refueling cavity 44.

From the refueling cavity 44, at a level of the plane defined by the junction between the head assembly 18 and the walls 28 of the reactor vessel 14, one of the free ends of the transport chain 126 is connected to the top of the chain support plug 58. The dosimetry chain 140, comprising the sensor sets 88 and holders 134, interconnecting beaded chain 90, and upper and lower stop elements 130 (FIG. 7), is then connected at one of its ends to the locating chain 128. The other end of the locating chain 128 is threaded through the hole 94 in the upper cross member 66 of the top access support stand 46, and is connected to the bottom of the chain support plug 58. The other end of the dosimetry chain 140 is likewise connected to the other free end of the transport chain 126 in order to complete the continuous loop through each of the U-shaped tubes 92. As necessary, the continuous loops 56 are cycled through the U-shaped tubes 92 to ensure a free movement. Each of the dosimetry chains 140 may further comprise an identification plate 132 which is attached in the vicinity of one of the stop elements 130.

In operation, when an operator first installs the reactor cavity dosimetry, the operator first compresses each spring-loaded pivot arm slide 52 and locks it in place with the bayonet joint (FIG. 3). Each pivot arm assembly 50 is thereafter depressed and rotated into the plane of the frame assembly 48. The top access support stand 46 (with the continuous chain loop 56 in place as described herein above) is then inserted within the reactor cavity 40 to be placed upon a ledge 150 (FIG. 2) formed in the primary biological shield 32.

After the top access support stand 46 has been thusly positioned by the operator, each pivot arm assembly 50 is rotated outwardly from the plane of the frame assembly 48 until the grooves 72 of the frame sleeves 70 latch into engagement with their respective pins 74 on the frame tubes 64, thereby locking the pivot arm assemblies 50 disposed perpendicularly across the reactor cavity 40.

The pivot arm slides 52 are then rotated by the operator to release each bayonet joint, thereby allowing the slides 52 to be spring-loaded against the insulation layer 60. Any differences in the radial clearance between the biological shield 32 and the insulation layer 60 as measured in the field are accounted for by appropriate preadjustments to the take-up bolts 54, threading the take-up bolts 54 into or out of their respective joint blocks 68 as needed to hold the top access support stand 46 in a substantially upright position, with the springs 84 partially compressed.

Thereafter, the dosimetry chains 128 are lowered into the reactor cavity 40 and appropriately locked into place by a portion of the chain's being entrapped by the slit 96 and retained by the plunger portion 112. As is known from copending application Ser. No. 032,894, the reactor cavity dosimetry may consist solely of lengths of the beaded chain 90, centered axially about the midplane of the core 16, or may additionally consist of solid state track recorders (SSTR) and radiometric monitors (RM) contained in aluminum capsules 136, as shown in FIG. 7, which are centered axially at preselected locations with respect to the core 16 (e.g., the upper and lower reactor vessel beltline circumferential welds).

Subsequent replacement of reactor cavity dosimetry involves operation of the plunger 110 to retract the plunger portion 112, sliding the transport chain 126 out of the slit 96, and then cycling the chain loop 56 hand-over-hand so that the dosimetry chain 140 is brought up to the elevation of the refueling cavity floor 160 (FIG. 2). The portion between the stop elements 130 is removed and replaced with new sensor sets 88, holders 134, and chain 90. The process is then reversed, lowering the chain hand-over-hand until the chain support plug 58 again rests on the top surface of the upper cross member 66, thus accurately repositioning the dosimetry axially relative to the core 16 and the reactor vessel 14. The transport chain side of the loop is pulled up snug, the chain is engaged within the slit 96 and the plunger 110 is released to serve as a keeper across the slit 96, thereby preventing the chain from coming out of the slit 96. Any excess chain is thereafter draped over the top access support stand 46 as shown in FIG. 3.

A method, according to the present invention, of monitoring neutron exposure to the reactor vessel 14 consists generally of the steps of forming a plurality of the sensor set 88, and remotely positioning the sensor sets 88 from a plane defined by the junction between the head assembly 18 and the insulation layer 60 attached to the walls 28 of the reactor vessel 14. The sensor sets 88 are thusly positioned at preselected positions within the reactor cavity 40, and exposed to neutrons by operating the plant 10. Upon exhaustion of the fuel elements 20 of the PWR 12, operations of the plant are ceased, the sensor sets 88 are retrieved remotely from the same plane, thereby minimizing interference with refueling operations. New sensor sets 74 are installed and accurately repositioned at the preselected heights relative to the reactor vessel 14 in order to better assess the long-term effects of neutron irradiation on properties of the reactor vessel material.

Obviously, many modifications and variations are possible in light of the above teachings. It should, therefore, be understood that within the scope of the appended claims the present invention may be practiced otherwise than as specifically described herein.

We claim as our invention:

1. In a nuclear power plant having a reactor vessel including a wall and a head assembly, a core contained within the reactor vessel which includes an array of neutron-producing fuel elements adapted for cyclical replacement upon exhaustion of the fuel, ex-core detector means for measuring a neutron flux, and a primary biological shield substantially surrounding the reactor vessel thereby forming a reactor cavity between the wall and the shield, a system for monitoring neutron exposure to the reactor vessel, comprising:

passive dosimetry means for indicating a neutron dosage accumulated over the fuel cycle at a plurality of different preselected locations axially with respect to the core within the cavity, wherein said indicating means is supplemental to the ex-core neutron detecting means; and means for remotely positioning said indicating means accurately and repeatedly at said same plurality of different preselected locations within the cavity, said remote positioning means disposed substantially at a plane where the head assembly joins the wall.

2. The system according to claim 1, wherein said indicating means comprises a plurality of neutron sensor sets.

3. The system according to claim 2, wherein each said sensor set comprises a passive dosimeter.

4. The system according to claim 2, wherein each said sensor set comprises:

at least one dosimeter; and means for housing said at least one dosimeter.

5. The system according to claim 4, Wherein said at least one dosimeter is selected from the group of radiometric monitors and solid state track recorders.

6. The system according to claim 2, wherein said indicating means further comprises a plurality of gradient chains connecting said sensor sets, said gradient chains being adapted to react with iron, nickel and cobalt.

7. The system according to claim 6, wherein said gradient chains each comprise a predetermined length of beaded chain formed from an alloy of stainless steel.

8. The system according to claim 1, wherein said remote positioning means comprises:
   means for locating a plurality of predetermined heights relative to the reactor vessel; and
   means for collecting said indicator means.

9. The system according to claim 8, wherein said means for locating comprises means for transferring said indicating means from said preselected locations to a collection location, said transfer means being adapted to minimize interference with a refueling operation undertaken at the end of the fuel cycle.

10. The system according to claim 9, wherein said locating means comprises:
    a plurality of plates, each said plate being mounted within the cavity at a respective predetermined height; and
    means, attached to each said plate for guiding said transfer means.

11. The system according to claim 10, wherein said guiding means comprises:
    a pair of brackets, each said bracket including a hole; and
    a U-shaped tube, each leg of said tube extending upwardly through and attached to a respective one of said holes.

12. The system according to claim 11, wherein said locating means comprises:
    a length of beaded chain threaded through said tube;
    a pair of stop elements, each said stop element being attached to a respective end of said chain thereby limiting the movement of said chain through said tube between a deployed position corresponding to said predetermined heights and a collecting position adapted for retrieval of said sensors sets, wherein said stop elements are further attached to said sensor sets thereby forming a continuous loop; and
    means for holding said loop in a selected position.

13. The system according to claim 12, further comprising a support stand installed within the cavity above said predetermined heights.

14. The system according to claim 13, wherein said support stand comprises:
    a pair of frame tubes;
    a pair of cross members each of which are attached to said frame tubes thereby forming a substantially rectangular frame assembly; and
    means for maintaining said frame assembly in a substantially upright position within the cavity.

15. The system according to claim 14, wherein said holding means comprises:
    a slit formed in one of said pair of cross members, said slit being adapted to contain a portion of one end of said beaded chain forming said continuous loop;
    means for suspending said beaded chain contained within said slit;
    a hole formed in said one of said pair of cross members through which the other end of said continuous loop is adapted to be fed; and
    a chain support plug to which said other end of the continuous loop is attached, said chain support plug being adapted to engage said hole thereby fixing said continuous loop with said sensor sets at a preselected axial position relative to said core.

16. The system according to claim 15, wherein said suspending means comprises a spring-loaded plunger having a plunger portion extendable across and above said slit.

17. The system according to claim 14, wherein said maintaining means comprises a pair of pivotable arm assemblies coupled to said frame assembly.

18. The system according to claim 17, where each said pivotable arm assembly comprises:
    a frame sleeve coaxially coupled about a respective one of said frame tubes;
    a joint block coupled to said frame sleeve;
    a pivot arm tube coupled to said joint block;
    a pivot arm slide coaxially coupled for sliding engagement about said pivot arm tube; and
    means for locking said frame sleeve in position with its attached pivot arm tube disposed perpendicular to said frame assembly.

19. The system according to claim 18, wherein said locking means comprises:
    a pair of diametrically opposed grooves formed at one end o said frame sleeve;
    a pair of diametrically opposed pins operable by spring means to extend outward from said frame tube at an upper end thereof, said pins being adapted to fit within said grooves; and
    means for biasing said frame sleeve upward along said frame tube, thereby engaging said pins within said grooves when said pivot arm tube is disposed perpendicular with respect to said frame assembly.

20. The system according to claim 18, further comprising means for biasing said pivot arm slide outward from its respective pivot arm tube.

21. The system according to claim 20, wherein said biasing means comprises a spring installed within said pivot arm slide.

22. The system according to claim 21, further comprising bayonet means for locking said pivot arm slide in a position inwardly along said pivot arm tube, said bayonet means in said position compressing said spring.

23. The system according to claim 18, further comprising a radial take-up bolt threadedly coupled to said joint block opposite said pivot arm tube, said bolt being adjustably positioned inwardly and outwardly from said joint block to maintain said frame assembly in a substantially upright position.

24. The system according to claim 12, further comprising an identification tag attached to said chain, said identification tag including information relating to the plant, the location of said sensor sets within the plant corresponding to a particular azimuth, and the date of dosimetry installation.

25. A method of monitoring neutron exposure to a reactor vessel having a wall and a head assembly in a nuclear power plant having a core contained within said vessel which includes an array of neutron-producing fuel elements adapted for cyclical replacement upon exhaustion of the fuel, and a primary biological shield substantially surrounding said vessel thereby forming a reactor cavity between said vessel and said shield, wherein the method comprises the steps of:
    (a) forming a plurality of neutron sensor sets adapted to indicate a neutron dosage accumulated over the fuel cycle;

(b) remotely positioning said sensor sets at a plurality of preselected locations within the cavity at a plane where the head assembly joins the wall;

(c) exposing said remotely positioned sensor sets by operating the plant through a fuel cycle;

(d) remotely retrieving, upon cessation of plant operations following a said fuel cycle, said exposed sensor sets from said plane;

(e) conducting neutron activation analysis of said exposed sensor sets;

(f) replacing a like plurality of neutron sensor sets at said plurality of preselected locations; and (g) again operating said plant through a fuel cycle and retrieving the exposed sensor sets for analysis.

26. The method as described in claim 25, wherein said step of remotely positioning comprises affixing said sensor sets to a chain and positioning said chain in a predetermined position within said cavity.

27. The method as described in claim 26, wherein said step of retrieving comprises moving said chain to an accessible position at said plane and removing said sensor sets from said chain.

28. A method of supporting a radiation sensor set accurately positioned at a preselected height within the cavity of a pressurized water reactor of a nuclear power plant, the reactor having a reactor vessel for containing the core which includes walls and a head assembly, said method comprising the steps of:

(a) providing a support stand having a generally rectangular frame assembly and pivotable means for holding said frame assembly in a substantially upright position, said holding means including means for locking same in a pivoted position across the cavity;

(b) providing a chain to suspend the sensor set;

(c) providing a generally U-shaped tube at a location beneath said support stand and the preselected height, the ends of said U-shaped tube extending upward towards said support stand;

(d) routing one end of said chain through said U-shaped tube;

(e) attaching the other end of said chain to the sensor set;

(f) forming a continuous loop with said chain and the sensor set;

(g) providing means attached to said continuous loop for indicating when the sensor set is disposed at the preselected height;

(h) providing means for holding said continuous loop to said support stand;

(i) rotating said continuous loop within said U-shaped tube until such point that said indicating means is proximate to said holding means; and (j) engaging said holding means.

* * * * *